United States Patent [19]

Greiert

[11] Patent Number: 4,541,673
[45] Date of Patent: Sep. 17, 1985

[54] REMOVABLE SLIDER SHOE FOR A TRANSLATING SLEEVE USED ON A JET ENGINE COWL AND DUCT

[75] Inventor: Alfred H. Greiert, Wichita, Kans.

[73] Assignee: The Boeing Company, Seattle, Wash.

[21] Appl. No.: 496,098

[22] Filed: May 19, 1983

[51] Int. Cl.⁴ ............................................. F16C 29/02
[52] U.S. Cl. ..................................... 308/3 R; 308/4 R
[58] Field of Search .............. 308/3 R, 4 R, 3 C, 4 A, 308/3 A

[56] References Cited

U.S. PATENT DOCUMENTS

| | | | |
|---|---|---|---|
| 3,680,647 | 8/1972 | Dixon et al. | 308/4 A |
| 4,114,945 | 9/1978 | Lutz | 308/3 R |
| 4,135,760 | 1/1979 | Grossbach | 308/3 R |

Primary Examiner—Lenard A. Footland
Attorney, Agent, or Firm—Edwin H. Crabtree

[57] ABSTRACT

A removable slider shoe for mounting on a translating sleeve of a jet engine cowl and duct. The sleeve includes a slider which moves in a track on the cowl when the engine is in a reverse thrust mode in order to expose airflow turning vanes. The movable shoe is mounted on the slider.

2 Claims, 7 Drawing Figures

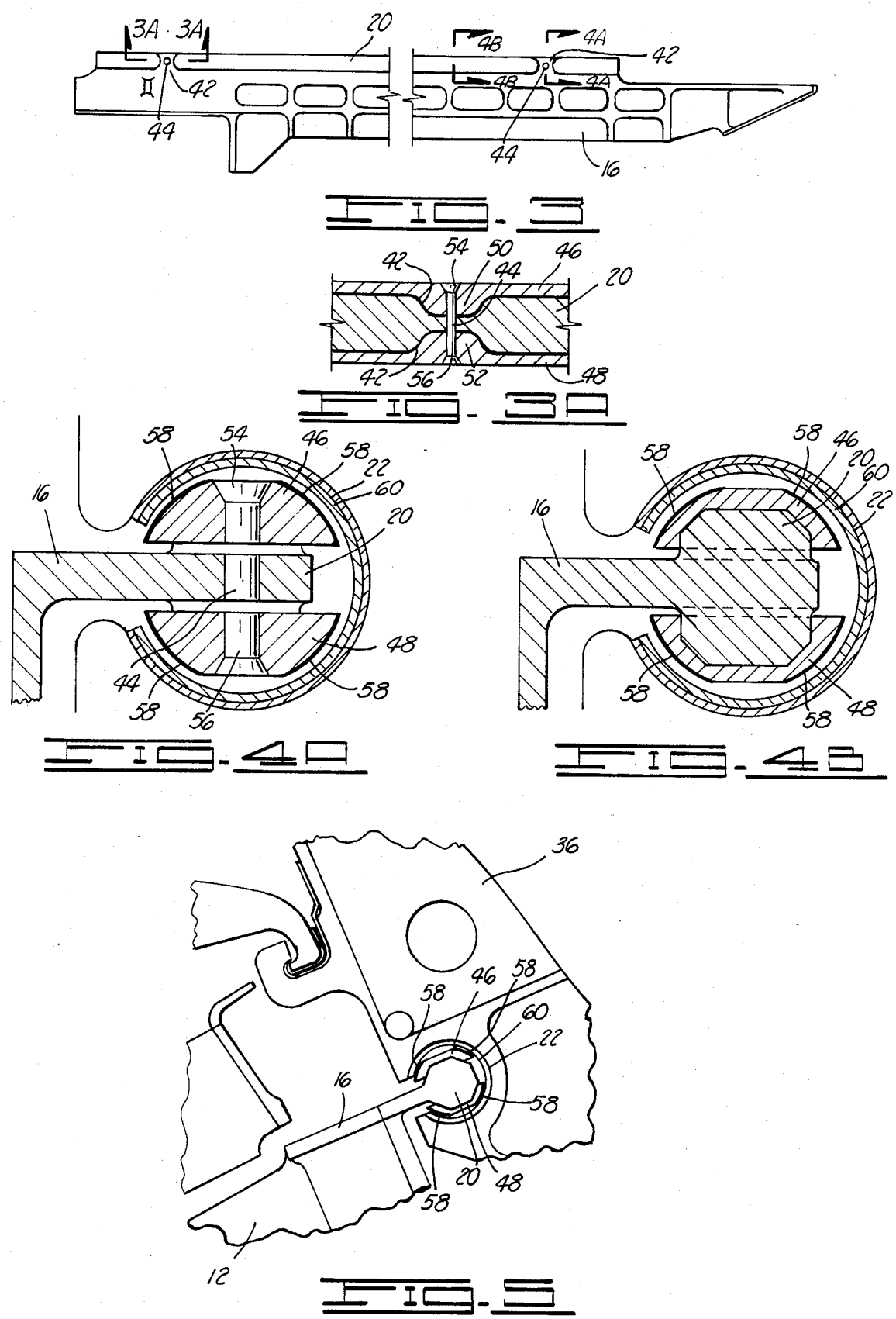

REMOVABLE SLIDER SHOE FOR A TRANSLATING SLEEVE USED ON A JET ENGINE COWL AND DUCT

BACKGROUND OF THE INVENTION

This invention relates to an improved low friction bearing surface for a translating sleeve used on a jet engine cowl and duct and more particularly but not by way of limitiation to a pair of removable split shoes adapted for receipt on the slider of the translating sleeve.

Heretofore jet engine installations having a movable translating sleeve with aluminum slider included a plastic rub surface bonded on the slider. When the plastic rub surface became worn, no tool or method and been devised to bond on a new rub surface or to properly remove the old surface without completely removing the entire translating sleeve so the slider could be reworked and a new rub surface bonded thereon.

In U.S. Pat. No. 3,095,247 to Zelesky, U.S. Pat. No. 3,824,784 to Kitson et al, U.S. Pat. No. 4,005,822 to Timms, U.S. Pat. No. 4,145,877 to Montgomery and U.S. Pat No. 3,147,028 to Rodgers, various types of slider shoes having different types of plain and roller bearing attachments are disclosed. None of these prior art patents specifically teach or illustrate the unique features of the invention as described herein.

SUMMARY OF THE INVENTION

The subject invention eliminates the time and expense of removing a solid molded shoe used in the past and attached to the slider.

The removable shoe when worn can be quickly removed and replaced for providing a new low friction rub surface for receipt on the track in the engine cowl.

Further the removable shoe includes elongated split semi-circular shoes having a plurality of lugs integrally formed on the inner circumference of the split shoes and extending outwardly therefrom for receipt in slots along the length of the slider. The lugs transmit fore and aft loads placed on the shoes to the slider. Also the lugs reduce the chance of the split shoes shearing away from the slider when the fore and aft loads are placed thereon.

The removable split shoe for mounting on a translating sleeve of a jet engine cowl and duct includes a first and second elongated split shoe having a semi-circular shape and adapted for receipt on opposite sides of a circular slider. The split shoes further include apertures therethrough for receiving a fastener for securing the split shoes to the slider.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 is a top view of the slider attachment fitting with the split shoes removed.

FIG. 3A is a sectional view of the slider taken along lines 3A—3A shown in FIG. 3.

FIG. 4A is an enlarged sectional view of the slider attachment fitting with split shoes mounted on the slider and taken along lines 4A—4A shown in FIG. 3.

FIG. 4B is an enlarged sectional view of the slider attachment fitting with slider and split shoes taken along lines 4B—4B shown in FIG. 3.

FIG. 5 is an enlarged end view of the slider attachment fitting, slider and split shoes received in the track in the upper bifurcation casting of the engine cowl.

DETAILED DESCRIPTION OF THE DRAWINGS

Figure 1:
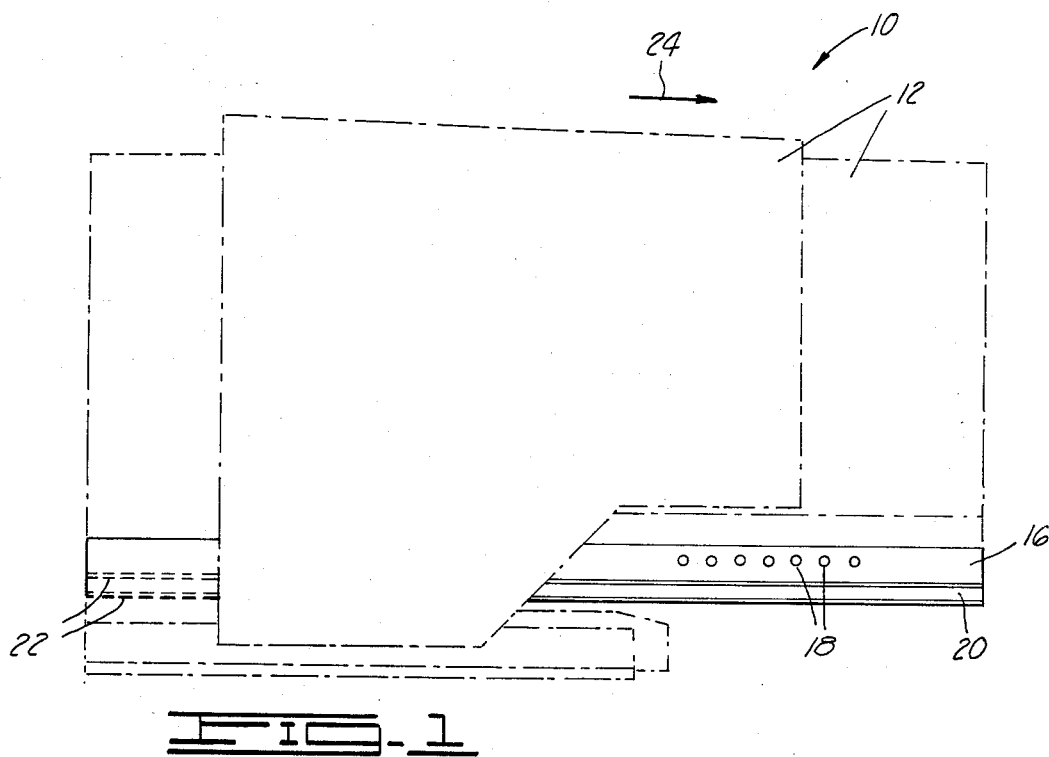
FIG. 1 is a side view of a portion of a jet engine cowling illustrating the movable translating sleeve assembly.

In FIG. 1 is a side view of a portion of a jet engine cowl is shown and designated by general reference numeral 10. The engine cowl 10 includes a movable translating sleeve assembly 12 which is part of the cowl 10 and outer fan duct 14. The sleeve assembly 12 includes a slider attachment fitting 16 secured to the assembly 12 by fasteners 18. The slider attachment fitting 16 includes a slider 20 adapted for receipt in a track 22 shown in dotted lines.

Figure 2:
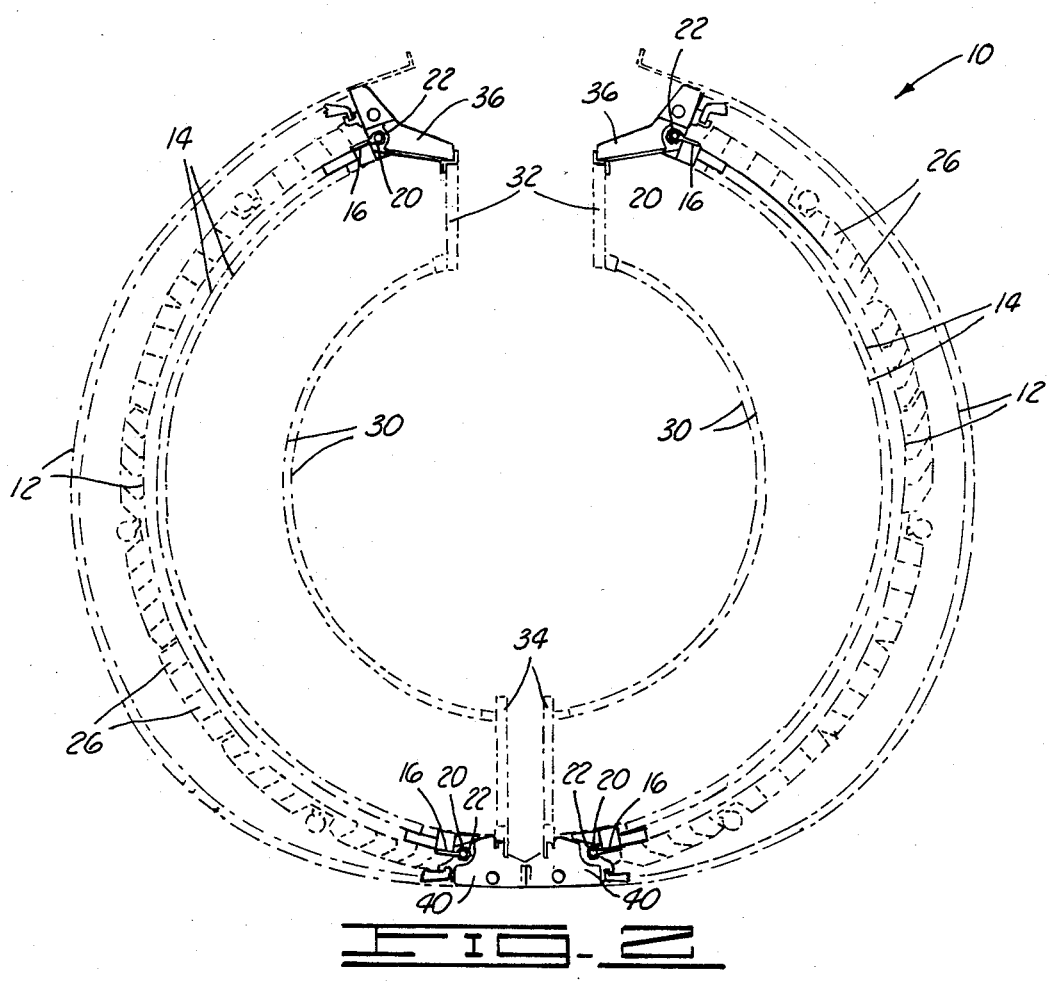
FIG. 2 is an end view of an engine cowling showing the inner and outer fan duct walls, air flow turning vanes and the upper and lower tracks for receiving the slider with split shoes therein.

When the jet engine is in a reverse thrust mode, the movable translating sleeve assembly 12 moves to the right as indicated by arrow 24. At this time, air flow turning vanes 26 shown in FIG. 2 are exposed. Also at this time the slider 20 moves to the right and along the track 22.

As mentioned above the slider 20 or track 22 heretofore was treated with low friction surfaces or coatings to reduce the force needed to translate the sleeve assembly 12. When the rub surface became worn no tool or method had been devised to bond on a new surface or to properly remove the old wear surfaces.

In FIG. 2 the cowl 10 can be seen surrounding the air flow turning vanes 26 along with outer fan duct walls 14 and inner fan duct walls 30. The fan duct walls 14 and 30 are joined together by upper bifurcation walls 32 and lower bifurcation walls 34. The upper bifurcation walls 32 include stationery hinge beams 36 having upper tracks 22 therein for receiving the slider 20. Also the lower portion of the cowl 10 includes a pair of latch beams 40 attached to the lower bifurcation walls 34. The two latch beams include lower tracks 22 which are identical to the upper tracks 22. The lower tracks 22 also receive a slider 20 therein.

In FIG. 3 a top view of the slider attachment fitting 16 can be seen with the slider 20 shown extending therefrom. The slider 20 is circular in shape and along its length are included a plurality of slots 42. The slots 42 in the slider 20 also include apertures 44 therethrough for receiving a fastener. The fastener may be a rivet, threaded screw or the like for securing at removable elongated first split shoe 46 and elongated second split shoe 48. The fastener is not shown in the drawings. The split shoes 46 and 48 are not shown in FIG. 3 for the purpose of clarity but are shown in FIGS. 3A, 4A & 4B.

In FIG. 3A which is taken along lines 3A-3A shown in FIG. 3 the slots 42 along the length of the slider 20 can be seen. Also in this view a portion of the split shoes 46 and 48 can be seen having lugs 50 and 52 integrally formed in the inner circumference of the split shoes and received in the slots 42. The lugs 50 and 52 are disposed along the length of the split shoes 50 and 52 and are designed to transfer the fore and aft loads from the split shoes 50 and 52 to the slider 20. Also the lugs 50 and 52 prevent the shoes 50 and 52 from shearing away from the slider 20 when loads are placed thereon.

In FIG. 4A a side sectional view of the slider attachment fitting 16 and slider 20 are shown with the split semi-circular shoes 46 and 48 mounted on opposite sides of the slider 20 with the shoes 46 and 48 having apertures 54 and 56 indexed with the hole 44 for receiving the fasteners therethrough and securing the split shoes to the slider 20.

The split shoes 46 and 48 may be made of aluminum or any other similar material with a low friction bonded wear surface 58 on the outer circumference for bearing against a track liner 60 disposed around the circular track 22. The bonded surface 58 on the split shoes 46 and 48 can be nylatron or any other low friction bonding material.

FIG. 4B is similar to 4A but taken along lines 4B—4B in FIG. 3. In this figure the split shoes 46 and 48 can be seen in cross section without the lugs 50 and 52 extending from the inner circumference of the split shoes.

In FIG. 5 part of the hinge beam 36 can be seen with the upper track 22 therein along with track liner 60. In this view the slider attachment fitting 16 can be seen extending outwardly from the movable translating sleeve assembly 12 with the slider 20 having the upper elongated removable split shoe 46 and 48 attached thereto for engaging the track liner 60.

From the above discussion it can be appreciated through the use of the removable elongated split shoes 46 and 48, when the wear surface on the shoes becomes worn, by removing the fasteners used to secure the split shoes to the slider 20, the shoes can be removed and a new wear surface can be installed. This unique feature of the subject invention reduces time and expense which heretofore was required when a solid molded shoe was used with a bonded wear surface thereon.

Changes may be made in the construction and arrangement of the parts or elements of the embodiments as described herein without departing from the spirit or scope of the invention defined in the following claims.

What is claimed is:

1. A removable slider shoe for mounting on a translating device of a jet engine cowl and duct, the sleeve having a slider which moves in a circular track on the cowl, the shoe comprising:

an elongated first shoe half having a portion of its outer circumference rounded and adapted for receipt on one side of the slider, the first shoe half having a plurality of lugs integrally formed in the inner circumference thereof and extending outwardly therefrom, the lugs adapted for receipt in slots along the length of the slider;

an elongated second shoe half having a portion of its outer circumference rounded and adapted for receipt on the opposite side of the slider, the second shoe half having a plurality of lugs integrally formed in the inner circumference thereof and extending outwardly therefrom, the lugs adapted for receipt in slots along the length of the slider, the lugs of the first and second shoe halves transmitting fore and aft loads from the shoe halves to the slider; and a plurality of apertures through the shoe halves and the slider for receiving fasteners therethrough and securing the shoe halves to the sides of the slider.

2. The shoe as described in claim 1 wherein the shoe halves are made of metal such as aluminum with a bonded low friction rub surface on the outer circumference thereof.

* * * * *